(12) United States Patent
Kim

(10) Patent No.: US 12,533,087 B2
(45) Date of Patent: Jan. 27, 2026

(54) METHOD AND APPARATUS FOR VISUALIZING BIOLOGICAL TISSUE

(71) Applicant: KOREA NATIONAL UNIVERSITY OF TRANSPORTATION INDUSTRY-ACADEMIC COOPERATION FOUNDATION, Chungcheongbuk-do (KR)

(72) Inventor: Young Woo Kim, Chungcheongbuk-do (KR)

(73) Assignee: KOREA NATIONAL UNIVERSITY OF TRANSPORTATION INDUSTRY-ACADEMIC COOPERATION FOUNDATION, Chungcheongbuk-do (KR)

( * ) Notice: Subject to any disclaimer, the term of this patent is extended or adjusted under 35 U.S.C. 154(b) by 237 days.

(21) Appl. No.: 18/564,032

(22) PCT Filed: Apr. 7, 2022

(86) PCT No.: PCT/KR2022/005008
§ 371 (c)(1),
(2) Date: Sep. 19, 2024

(87) PCT Pub. No.: WO2022/250281
PCT Pub. Date: Dec. 1, 2022

(65) Prior Publication Data
US 2025/0339107 A1    Nov. 6, 2025

(30) Foreign Application Priority Data

May 25, 2021    (KR) .................. 10-2021-0066729

(51) Int. Cl.
*A61B 5/00*    (2006.01)
*A61B 5/055*    (2006.01)
(Continued)

(52) U.S. Cl.
CPC .......... *A61B 5/7425* (2013.01); *A61B 5/0035* (2013.01); *A61B 5/055* (2013.01);
(Continued)

(58) Field of Classification Search
CPC .................................................. A61B 5/7425
See application file for complete search history.

(56) References Cited

U.S. PATENT DOCUMENTS 9,466,129 B2    10/2016    Day et al.
2013/0121465 A1    5/2013    Cho

FOREIGN PATENT DOCUMENTS

JP    2011-139854 A    7/2011
JP    2013-085967 A    5/2013
(Continued)

OTHER PUBLICATIONS

Korean Patent Office, Written Decision on Registration, Application No. 10-2021-0066729, dated Mar. 18, 2024, in 4 pages.
(Continued)

*Primary Examiner* — Joseph M Santos Rodriguez
(74) *Attorney, Agent, or Firm* — PROCOPIO, CORY, HARGREAVES & SAVITCH LLP

(57) ABSTRACT

Disclosed is an apparatus for visualizing a biological tissue. The apparatus may include a display, at least one processor, and a memory electrically connected to the processor and configured to store at least one code performed by the processor. By providing the apparatus, reading of captured images of a biological tissue may be easily performed, thereby improving user convenience.

5 Claims, 3 Drawing Sheets

(51) Int. Cl.
  *A61B 6/00* (2006.01)
  *A61B 6/03* (2006.01)
  *A61B 6/46* (2024.01)
(52) U.S. Cl.
  CPC .............. *A61B 6/032* (2013.01); *A61B 6/463* (2013.01); *A61B 6/5247* (2013.01)

(56) References Cited

FOREIGN PATENT DOCUMENTS

| KR | 10-0938863 B1 | 1/2010 |
| KR | 10-2013-0043974 A | 5/2013 |
| KR | 101462402 B1 | 11/2014 |
| KR | 10-1955919 B1 | 3/2019 |
| KR | 10-2020-0060102 A | 5/2020 |
| KR | 10-2222547 B1 | 3/2021 |
| KR | 10-2017-0065512 A | 12/2022 |

OTHER PUBLICATIONS

Patent Cooperation Treaty, International Search Report, Application No. PCT/KR2022/005008, dated Jul. 21, 2022, in 2 pages, translation only.

Request for the Submission of an Opinion received in Korean Application No. 10-2021-0066729, submission dated May 21, 2023, in 11 pages, with translation.

Request for the Submission of an Opinion, Last Notification, received in Korean Application No. 10-2021-0066729, submission dated Nov. 12, 2023, in 6 pages, with translation.

METHOD AND APPARATUS FOR VISUALIZING BIOLOGICAL TISSUE

TECHNICAL FIELD

The present disclosure relates to a method and an apparatus for effectively recognizing and visualizing a biological tissue from a captured image of a living body.

BACKGROUND ART

Recent development of radiological examination methods using imaging devices such as ultrasonic devices, computed tomography (CT) devices, and magnetic resonance imaging (MRI) devices has increased the importance of systems for detecting or diagnosing diseases of human bodies by means of medical image analysis and processing technologies.

However, even if radiological devices are used, it is difficult or inconvenient to identify complicated biological tissues with the naked eye.

Accordingly, there is a need for a method for identifying biological tissues more effectively.

The above description is only intended to provide background information related to embodiments of the present disclosure, and the description does not necessarily constitute the prior art.

DISCLOSURE OF INVENTION

Technical Problem

A problem to be solved by the present disclosure is to provide a method for recognizing and visualizing a captured image of a living body more effectively.

Another problem to be solved by the present disclosure is to provide a method for effectively recognizing and visualizing a biological tissue from a captured image of a living body by using a neural network-based algorithm.

Aspects of the present disclosure are not limited to the above-mentioned aspects, and other aspects and advantages of the present disclosure will be understood from the following description, and will become clearer from embodiments of the present disclosure. In addition, aspects and advantages of the present disclosure can obviously be implemented by means disclosed in the claims and a combination thereof.

Solution to Problem

In order to solve the above-mentioned problems, a method for visualizing a biological tissue according to an embodiment of the present disclosure may be provided.

The visualization method may include: acquiring voxel-structured living body image information from an imaging device configured to take an image of a biological tissue; displaying the acquired living body image information; in response to selection of a specific area including a search target biological tissue from the living body image information, making first adjustment of color intensity of areas other than the selected specific area within a predetermined range; based on characteristic information of the search target biological tissue, making second adjustment of color intensity of area inside the specific area within a predetermined range; in response to an input of a command to adjust color intensity of a specific voxel included in the specific area, making third adjustment of color intensity of the specific voxel; and repeatedly making the first to third adjustments until a predetermined condition is satisfied.

The making of first adjustment may include lowering color intensity of areas other than the selected specific area below color intensity of the specific area.

An apparatus for visualizing a biological tissue according to an embodiment of the present disclosure may include: a display; at least one processor; and a memory electrically connected to the processor and configured to store at least one code performed by the processor.

The memory may be configured to store a code which, when executed by the processor, causes the processor to acquire voxel-structured living body image information from an imaging device configured to take an image of a biological tissue, output the acquired living body image information to the display, in response to selection of a specific area including a search target biological tissue from the living body image information, make first adjustment of color intensity of areas other than the selected specific area within a predetermined range, based on characteristic information of the search target biological tissue, make second adjustment of color intensity of area inside the specific area within a predetermined range, and in response to an input of a command to adjust color intensity of a specific voxel included in the specific area, make third adjustment of color intensity of the specific voxel.

The memory may be configured to store a code which, when executed by the processor, causes the processor to select the specific area, based on an expected position of the biological tissue, identify a biological tissue inside the selected specific area, based on a pre-trained biological tissue recognition model, and highlight and display the identified biological tissue.

The memory may be configured to store a code which, when executed by the processor, causes the processor to, during the first adjustment, lower color intensity of areas other than the selected specific area below color intensity of the specific area.

Solutions to technical problems to be solved by the present disclosure are not limited to the above-mentioned solutions, and other solutions not mentioned herein will be clearly understood from the following description by those skilled in the art to which the present disclosure pertains.

Advantageous Effects of Invention

According to various embodiments of the present disclosure, even if a three-dimensionally configured biological tissue is expressed two-dimensionally, the biological tissue can be effectively recognized and visualized.

Advantageous effects of the present disclosure are not limited to the above description, and other advantageous effects not mentioned herein will be clearly understood from the following description by those skilled in the art to which the present disclosure pertains.

BEST MODE FOR CARRYING OUT THE INVENTION

Figure 1:
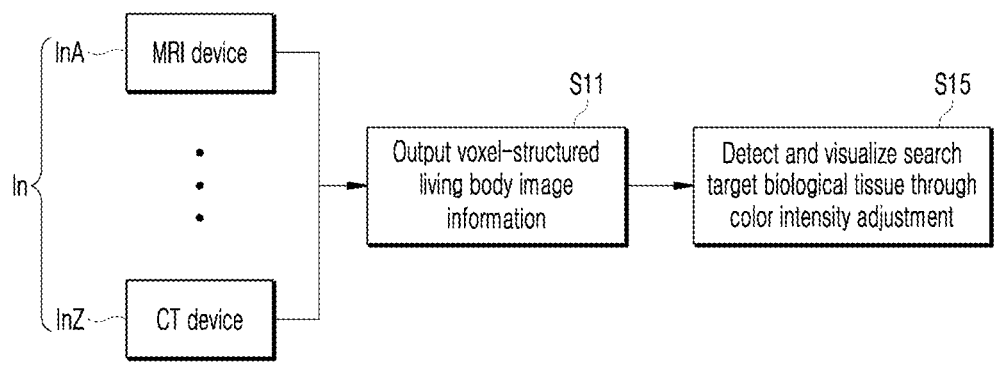
FIG. 1 schematically illustrates a method for visualizing a biological tissue according to an embodiment of the present disclosure.

Hereinafter, embodiments disclosed herein will be described in detail with reference to the attached drawings, wherein identical or similar components will be given identical reference numerals, and repeated descriptions thereof will be omitted. In the following description, terms "module" and "unit" used in conjunction with components are assigned or used interchangeably in order to facilitate descriptions only, and do not have intrinsic meanings or roles separated from each other.

In addition, in connection with describing embodiments of the present disclosure, detailed description of related prior arts will be omitted if deemed to unnecessarily obscure gist of embodiments disclosed herein. In addition, the attached drawings are only intended to help understanding of embodiments disclosed herein, and do not limit the technical idea disclosed herein, which is to be understood as encompassing all modifications, equivalents, and replacements falling within the idea and technical scope of the disclosure.

Terms including ordinal numbers such as "first" and "second" may be to describe various components, which are not limited by such terms. The terms are used only to distinguish one component from another.

The description that a component is "connected" or "coupled" to another component may not only mean that the components are directly connected or coupled to each other, but also mean that there may be an intermediate component therebetween. On the other hand, description that a component is "directly connected" or "directly coupled" to another component is to be understood as meaning that there is no intermediate component therebetween.

FIG. 1 schematically illustrates a method for visualizing a biological tissue according to an embodiment of the present disclosure.

Imaging devices In (InA-InZ) may capture images of a user in order to visualize the user's biological tissues. The imaging devices In may include various devices such as magnetic resonance imaging (MRI) devices, computed tomography (CT) devices, and ultrasonic devices, but embodiments are not limited thereto.

The magnetic resonance imaging (MRI) device InA may obtain specific sectional images of living bodies by using magnetic fields generated by magnetic forces. The computed tomography (CT) device InZ may project X-rays or ultrasonic waves to a human body at various angles by using a CT scanner, and may reconfigure the same with a computer, thereby obtaining tomographic images of the human body.

The biological tissue visualization apparatus 100 (in FIG. 2) may acquire voxel-structured living body image information from the imaging devices In (InA-InZ). As used herein, a voxel refers to a volume element, and may represent a regular grid-unit value in a three-dimensional space. The term "voxel" is a combination of "volume" and "pixel", and may mean that two-dimensional image data is displayed as pixels.

The biological tissue visualization apparatus 100 (in FIG. 2) may output voxel-structured living body image information through a display (S11), and may detect and visualize the search target biological tissue through color intensity adjustment (S15).

Figure 2:
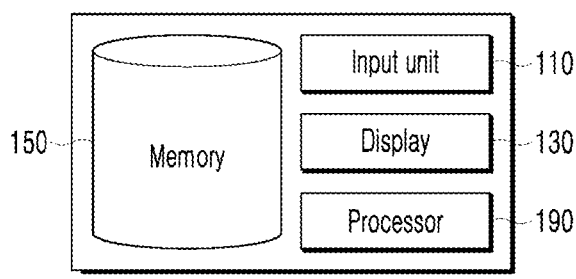
FIG. 2 is a block diagram illustrating the configuration of a biological tissue visualization apparatus according to an embodiment of the present disclosure.

FIG. 2 is a block diagram illustrating the configuration of a biological tissue visualization apparatus 100 according to an embodiment of the present disclosure. FIG. 2 will be referred to together with the reference numerals in FIG. 1.

The biological tissue visualization apparatus 100 may be configured to specify, detect, and visualize a biological tissue from living body image information of a user (for example, a person who receives medical treatment, examination, or the like) expressed in a voxel structure.

The biological tissue visualization apparatus 100 may include an input unit 110, a display 130, a memory 150, and at least one processor 190.

The input unit 110 may include a keyboard, a mouse, a touch input module, a haptic module, or the like so as to receive user manipulation commands, but embodiments are not limited thereto.

The display 130 may output voxel-structured living body image information collected from the imaging devices In.

The memory 150 may be electrically connected to the processor 190, store at least one code performed by the processor, and store an artificial intelligence-based neural network model.

The processor 190 may acquire voxel-structured living body image information from the imaging devices In for taking images of biological tissues, and may output the acquired living body image information to the display 130.

In an embodiment, the processor 190 may collect data configured in various formats (three-dimensional data formats, tomographic data series, and the like) from the imaging devices In, and may process the same into voxel-structured living body image information.

If a specific area including a biological tissue (search target) on the living body image information is selected, the processor 190 may adjust the color intensity of areas other than the selected specific area within a predetermined range (first adjustment).

In a first embodiment, the processor 190 may receive a command to select a specific area as an operative's manipulation. The operative may be a medical staff (including a doctor), a medical device operator, or the like, but embodiments are not limited thereto. The processor 190 may receive minimum and maximum values regarding the X-axis, Y-axis, and Z-axis from the operative, and may display or specify a specific area distinctively on the screen.

In a second embodiment, the processor 190 may store a pre-learned specific area configuration model in the memory 150 such that an area including a biological tissue is configured as a specific area, and the processor 190 may select a specific area, based on the specific area configuration model. Specifically, the processor 190 may select specific area, based on the expected position of the biological tissue, by using the specific area configuration model.

To this end, the processor 190 may train a specific area configuration model such that, based on the shape/form of various biological tissues, the position thereof inside living bodies, the color and size thereof, the type of the living bodies, and the like (label information), specific areas including corresponding biological tissues are selected from images. The label information may be implemented based on images.

As such, the processor 190 may adjust the color intensity of areas other than a selected specific area within a predetermined range (first adjustment). The processor 190 may configure a low level of brightness such that areas other than a specific area are displayed transparent, but embodiments are not limited thereto.

That is, the processor 190 may configure a low level of color intensity such that areas other than a specific area are changed and displayed transparent. Accordingly, the specific area is solely expressed in more detail such that the operative who reviews captured images of living bodies can have a reduce amount of work, thereby improving user convenience.

In addition, the processor 190 may adjust the color intensity of area inside the specific area within a predetermined range, based on characteristic information of the search target biological tissue (second adjustment). The characteristic information may be information specifying whether the biological tissue is a hard tissue or a soft tissue. For example, hard tissues (for example, bones) may be displayed more clearly, and soft tissues (for example, muscles, organs, and the like) may be displayed more transparently than the hard tissues.

In the first embodiment, even inside a specific area, the processor 190 may adjust the color intensity of at least a part inside the specific area according to the operative's selection command. The processor 190 may adjust the color intensity (for example, brightness) of at least a partial area inside the specific area according to the operative's selection command (for example, configuration using the mouse/button).

This is because hard tissues have a high level of optical reflectivity than soft tissues such that, when observing hard tissues, the color intensity may be adjusted to observe the same in more detail, and when observing soft tissues, the color intensity may be adjusted to observe the same in more detail.

In the second embodiment, the processor 190 may use a biological tissue recognition model configured to recognize hard tissues and soft tissues in a specific area. The processor 190 may distinguish hard tissues and soft tissues in a specific area regardless of the operative's selection.

To this end, the processor 190 may identify and distinguish biological tissues (hard tissues, soft tissues, and the like) inside a specific area by using a pre-trained biological tissue recognition model based on the shape/form of various biological tissues, the position thereof inside living bodies, the color and size thereof, the type of the living bodies, and the like (label information).

The processor 190 may store a code in the memory 150 such that identified biological tissues are highlighted and displayed. For example, the processor 190 may store a code in the memory 150 such that, if it is difficult to distinguish a biological tissue solely based on the degree of brightness, the color of the biological tissue is changed, or the biological tissue is solely zoomed in on and displayed.

Upon receiving a command to adjust the color intensity of a specific voxel included in a specific area, the processor 190 may adjust the color intensity of the specific voxel (third adjustment).

For example, the processor 190 may output a voxel in a specific area to the display 130 such that, if selected by an eraser of a voxel size (which may be expressed as a regular hexahedron, for example), the voxel disappears. The processor 190 may have an undelete function such that voxels deleted by the eraser can be restored. This may be expressed in the inverse time order, but embodiments are not limited thereto.

Figure 3:
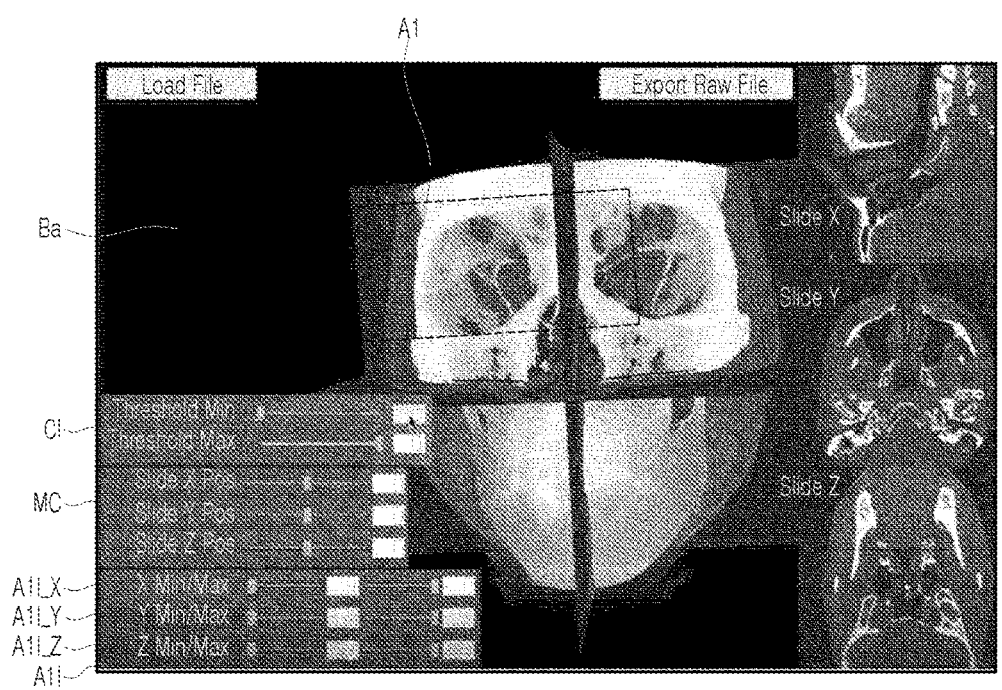
FIG. 3 illustrates living body image information displayed by a biological tissue visualization apparatus according to an embodiment of the present disclosure.

FIG. 3 illustrates living body image information displayed by a biological tissue visualization apparatus according to an embodiment of the present disclosure.

Referring to FIG. 3, the biological tissue visualization apparatus 100 may configure the above-mentioned specific area A1, and may use an item menu A1*l* for adjusting the size of the specific area A1.

The item menu A1*l* may be used to adjust X-axis, Y-axis, and X-axis sizes (A1*l*_X,Y,Z) all. If the background area B*a* on the screen is selected, the processor 190 may output a popup window to the display 130 to indicate a wrong selection.

The biological tissue visualization apparatus 100 may provide an item MC for specifying the current cursor position such that, if it is difficult to designate a specific area A1, the cursor position may be used to specify the specific area A1 more easily.

Figure 4:
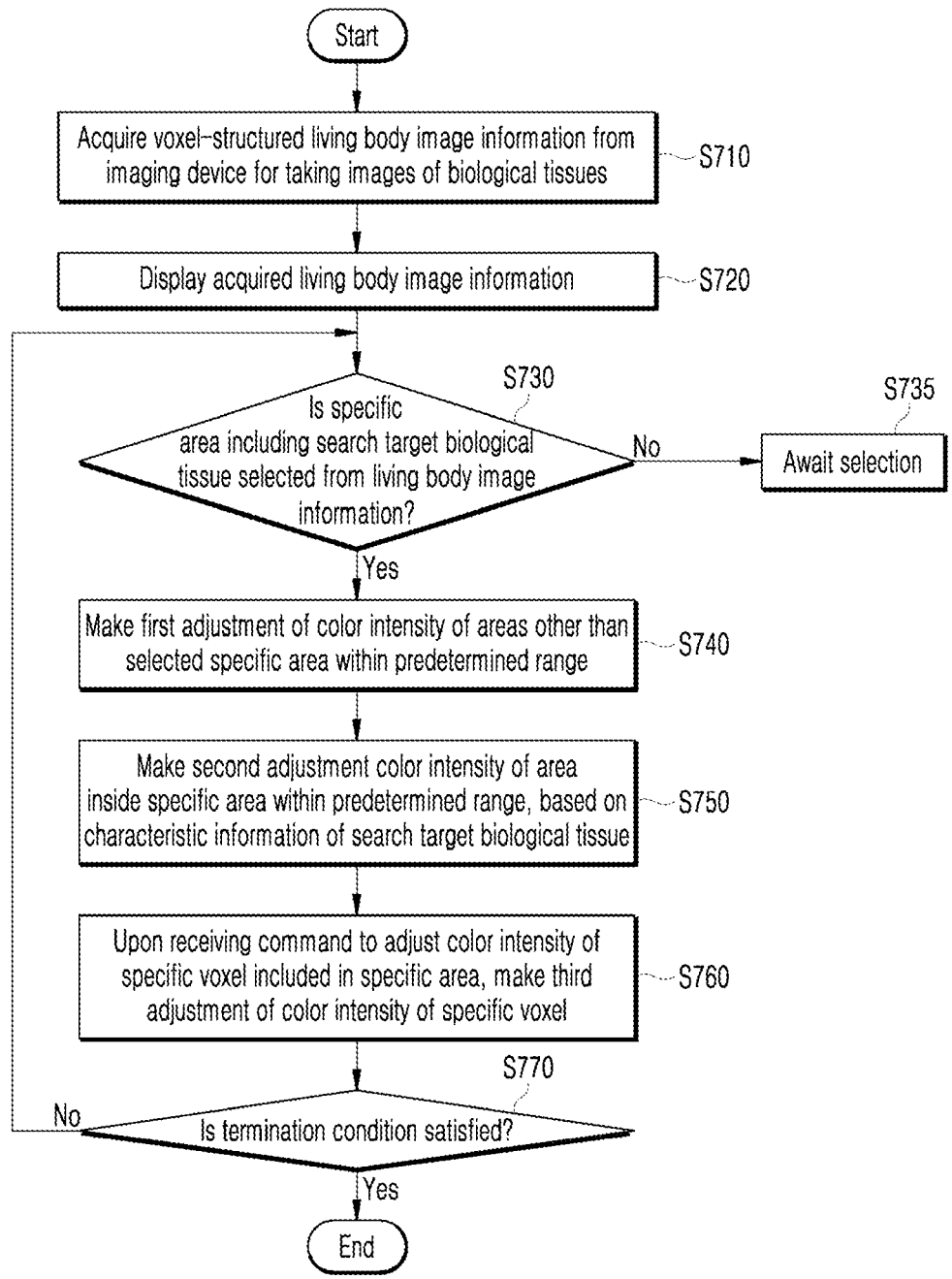
FIG. 4 is a sequence diagram illustrating a biological tissue visualization method according to an embodiment of the present disclosure.

FIG. 4 is a sequence diagram illustrating a biological tissue visualization method according to an embodiment of the present disclosure. Respective steps below may be performed by a processor of a biological tissue visualization apparatus.

The biological tissue visualization apparatus may initially acquire voxel-structured living body image information from an imaging device for taking images of biological tissues (S710).

The biological tissue visualization apparatus may then display the acquired living body image information (S720).

If a specific area including a search target biological tissue is selected from the living body image information (S730), the biological tissue visualization apparatus may make first adjustment of the color intensity of areas other than the selected specific area (S740).

If no specific area including a search target biological tissue is selected from the living body image information (S730), the biological tissue visualization apparatus may await selection (S735).

After step S740, the biological tissue visualization apparatus may make second adjustment the color intensity of the color intensity of area inside the specific area within a predetermined range, based on characteristic information of the search target biological tissue (S750).

The area subjected to second adjustment may be at least a partial area inside the specific area, and may be configured differently depending on characteristic information of the search target biological tissue. In addition, step S750 may be performed by lowering the color intensity.

Upon receiving a command to adjust the color intensity of a specific voxel included in a specific area, the biological tissue visualization apparatus may make third adjustment of the color intensity of the specific voxel (S760).

The biological tissue visualization apparatus may repeatedly perform the first to third adjustments until a specific termination condition is satisfied (S770). However, the order of the first, second, and third adjustments and the order in which they are repeated may vary.

The present disclosure described above can be implemented as a computer-readable code in a medium in which a program is recorded. The computer-readable medium includes all kinds of recording devices that store data which can be read by computer systems. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like. In addition, the computers may include processors of respective devices.

Meanwhile, the program may be specially designed and configured for the present disclosure, or may be known and available to those skilled in the art in the computer software field. Examples of the program may include not only machine language codes made by compliers, but also high-level language codes that can be executed with computers by using interpreters or the like.

The term "the" and similar indicating terms used in the specification (particularly, in the claims) of the present disclosure may correspond to both singular and plural numbers. In addition, a range described in the present disclosure includes the invention to which individual values belonging to the range are applied (unless otherwise mentioned), and is the same as describing individual values constituting the range in the detailed description of the present disclosure.

Steps constituting a method according to the present disclosure may be performed in an appropriate order if the order thereof is explicitly described, or if there is no description otherwise. The present disclosure is not necessarily limited by the order in which the steps are described. All examples or exemplary terms (for example, and the like) used in the present disclosure are simply for describing the present disclosure in detail, and the scope of the present disclosure is not limited by the examples or exemplary terms unless limited by the claims. In addition, those skilled in the art may understand that various modifications, combinations, and changed can be configured according to design conditions and factors within the scope of the appended claims or equivalents thereof.

Therefore, the idea of the present disclosure is not to be defined while being limited to the above-described embodiments, and not only the appended claims, but also all ranges equivalent thereto or equivalently changed therefrom are deemed to fall within the scope of the present disclosure.

The invention claimed is:

1. A method for visualizing a biological tissue, the method comprising:
    acquiring voxel-structured living body image information from an imaging device configured to take an image of a biological tissue;
    displaying the acquired living body image information;
    in response to selection of a specific area comprising a search target biological tissue from the living body image information, making first adjustment of color intensity of areas other than the selected specific area within a predetermined range;
    based on characteristic information of the search target biological tissue, making second adjustment of color intensity of area inside the specific area within a predetermined range;
    in response to an input of a command to adjust color intensity of a specific voxel included in the specific area, making third adjustment of color intensity of the specific voxel; and
    repeatedly making the first to third adjustments until a predetermined condition is satisfied.

2. The method of claim 1, wherein the making of first adjustment comprises lowering color intensity of areas other than the selected specific area below color intensity of the specific area.

3. An apparatus for visualizing a biological tissue, the apparatus comprising:
    a display;
    at least one processor; and
    a memory electrically connected to the processor and configured to store at least one code performed by the processor,
    wherein the memory is configured to store a code which, when executed by the processor, causes the processor to acquire voxel-structured living body image information from an imaging device configured to take an image of a biological tissue, output the acquired living body image information to the display, in response to selection of a specific area comprising a search target biological tissue from the living body image information, make first adjustment of color intensity of areas other than the selected specific area within a predetermined range, based on characteristic information of the search target biological tissue, make second adjustment of color intensity of area inside the specific area within a predetermined range, and in response to an input of a command to adjust color intensity of a specific voxel included in the specific area, make third adjustment of color intensity of the specific voxel.

4. The apparatus of claim 3, wherein the memory is configured to store a code which, when executed by the processor, causes the processor to select the specific area, based on an expected position of the biological tissue, identify a biological tissue inside the selected specific area, based on a pre-trained biological tissue recognition model, and highlight and display the identified biological tissue.

5. The apparatus of claim 3, wherein the memory is configured to store a code which, when executed by the processor, causes the processor to, during the first adjustment, lower color intensity of areas other than the selected specific area below color intensity of the specific area.

* * * * *